United States Patent
Cortez

(10) Patent No.: US 6,177,111 B1
(45) Date of Patent: Jan. 23, 2001

(54) ENCHILADA STYLE FOOD PRODUCT AND METHOD OF MAKING

(76) Inventor: Rose M. Cortez, 3449 Buckner Dr., San Jose, CA (US) 95127

(*) Notice: Under 35 U.S.C. 154(b), the term of this patent shall be extended for 0 days.

(21) Appl. No.: 09/339,800

(22) Filed: Jun. 24, 1999

(51) Int. Cl.[7] ............................................. A21D 2/26
(52) U.S. Cl. ........................ 426/94; 426/138; 426/466; 426/497
(58) Field of Search ............................ 426/94, 138, 466, 426/497

(56) References Cited

U.S. PATENT DOCUMENTS

| | | | |
|---|---|---|---|
| 4,638,729 | * | 1/1987 | Woodworth et al. ............... 99/450.6 |
| 4,691,627 | * | 9/1987 | Roberts ............................... 99/450.6 |
| 6,007,858 | * | 12/1999 | Gum et al. ........................... 426/297 |

OTHER PUBLICATIONS

Cookbook USA CD ROM—"Indian Kheema" Recipe, 1992 & 1993.*
Cuisine, Texas "Beef Cheese Enchiladas"; "El Plato Grande" Recipes, 1995.*
America's Regional Cookbook "Taos Enchilada", 1996.*
Sunset Mexican Cook Book. "Flour Tortilla" Enchilada Recipes pp. 54–61.*

* cited by examiner

Primary Examiner—Nina Bhat

(57) ABSTRACT

A enchilada style food product and method of making for providing a better tasting and nutritious enchilada style food product. The enchilada style food product and method of making includes flour tortillas, ground beef, yellow onion, potatoes, sweet peas, cheddar cheese, chili powder, salt, and tomato sauce. The method generally includes making the flour tortillas; making a meat mixture using the ground beef, onions, and salt; making a chili sauce mixture using the chili powder, water and tomato sauce; boiling diced potatoes; coating the tortillas with the chili sauce mixture, rolling the meat mixture, the boiled potatoes, sweet peas, and cheese into the coated tortilla; frying a seamed side of the rolled tortilla until crisp; frying an opposite side of the rolled tortilla until crisp; garnishing; and serving.

14 Claims, 2 Drawing Sheets

ENCHILADA STYLE FOOD PRODUCT AND METHOD OF MAKING

BACKGROUND OF THE INVENTION

1. Field of the Invention

The present invention relates to food products and methods and more particularly pertains to a new enchilada style food product and method of making for providing a better tasting and nutritious enchilada style food product.

2. Description of the Prior Art

The use of food products and methods is known in the prior art. More specifically, food products and methods heretofore devised and utilized are known to consist basically of familiar, expected and obvious configurations, notwithstanding the myriad of combinations in the crowded prior art which have been developed for the fulfillment of countless objectives and requirements.

Known prior art includes U.S. Pat. No. 5,510,126; U.S. Pat. No. 4,400,404; U.S. Pat. No. 5,260,083; U.S. Pat. No. 5,258,198; U.S. Pat. No. 4,693,900; U.S. Pat. No. 4,393,090; U.S. Pat. No. 4,396,817; U.S. Pat. No. 5,356,648; U.S. Pat. No. 5,106,643; U.S. Pat. No. 4,935,259; U.S. Pat. No. 4,597,974; and U.S. Pat. No. Des. 343,494; and U.S. Pat. No. Des. 339,744.

While these devices fulfill their respective, particular objectives and requirements, the aforementioned patents do not disclose a new enchilada style food product and method of making. The inventive device includes flour tortillas, ground beef, yellow onion, potatoes, sweet peas, cheddar cheese, chili powder, salt, and tomato sauce.

In these respects, the enchilada style food product and method of making according to the present invention substantially departs from the conventional concepts of the prior art, and in so doing provides an apparatus primarily developed for the purpose of providing a better tasting and nutritious enchilada style food product.

SUMMARY OF THE INVENTION

In view of the foregoing disadvantages inherent in the known types of food products and methods now present in the prior art, the present invention provides a new enchilada style food product and method of making construction wherein the same can be utilized for providing a better tasting and nutritious enchilada style food product.

The general purpose of the present invention, which will be described subsequently in greater detail, is to provide a new enchilada style food product and method that has many of the advantages of the food products and methods mentioned heretofore and many novel features that result in a new enchilada style food product and method of making which is not anticipated, rendered obvious, suggested, or even implied by any of the prior art food products and methods, either alone or in any combination thereof.

To attain this, the present invention generally comprises flour tortillas, ground beef, yellow onion, potatoes, sweet peas, cheddar cheese, chili powder, salt, and tomato sauce.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new enchilada style food product and method of making that has many of the advantages of the food products and methods mentioned heretofore and many novel features that result in a new enchilada style food product and method of making that is not anticipated, rendered obvious, suggested, or even implied by any of the prior art food products and methods, either alone or in any combination thereof.

It is another object of the present invention to provide a new enchilada style food product and method of making which may be easily and efficiently prepared and marketed.

An even further object of the present invention is to provide a new enchilada style food product and method of making which is susceptible of a low cost of preparation with regard to both materials and labor, and which accordingly is then susceptible of low prices of sale to the consuming public, thereby making such enchilada style food product and method of making economically available to the buying public.

Still yet another object of the present invention is to provide a new enchilada style food product and method of making which provides in the products and methods of the prior art some of the advantages thereof, while simultaneously overcoming some of the disadvantages normally associated therewith.

Still another object of the present invention is to provide a new enchilada style food product and method of making for providing a better tasting and nutritious enchilada style food product.

Yet another object of the present invention is to provide a new enchilada style food product and method of making which includes flour tortillas, ground beef, yellow onion, potatoes, sweet peas, cheddar cheese, chili powder, salt, and tomato sauce.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
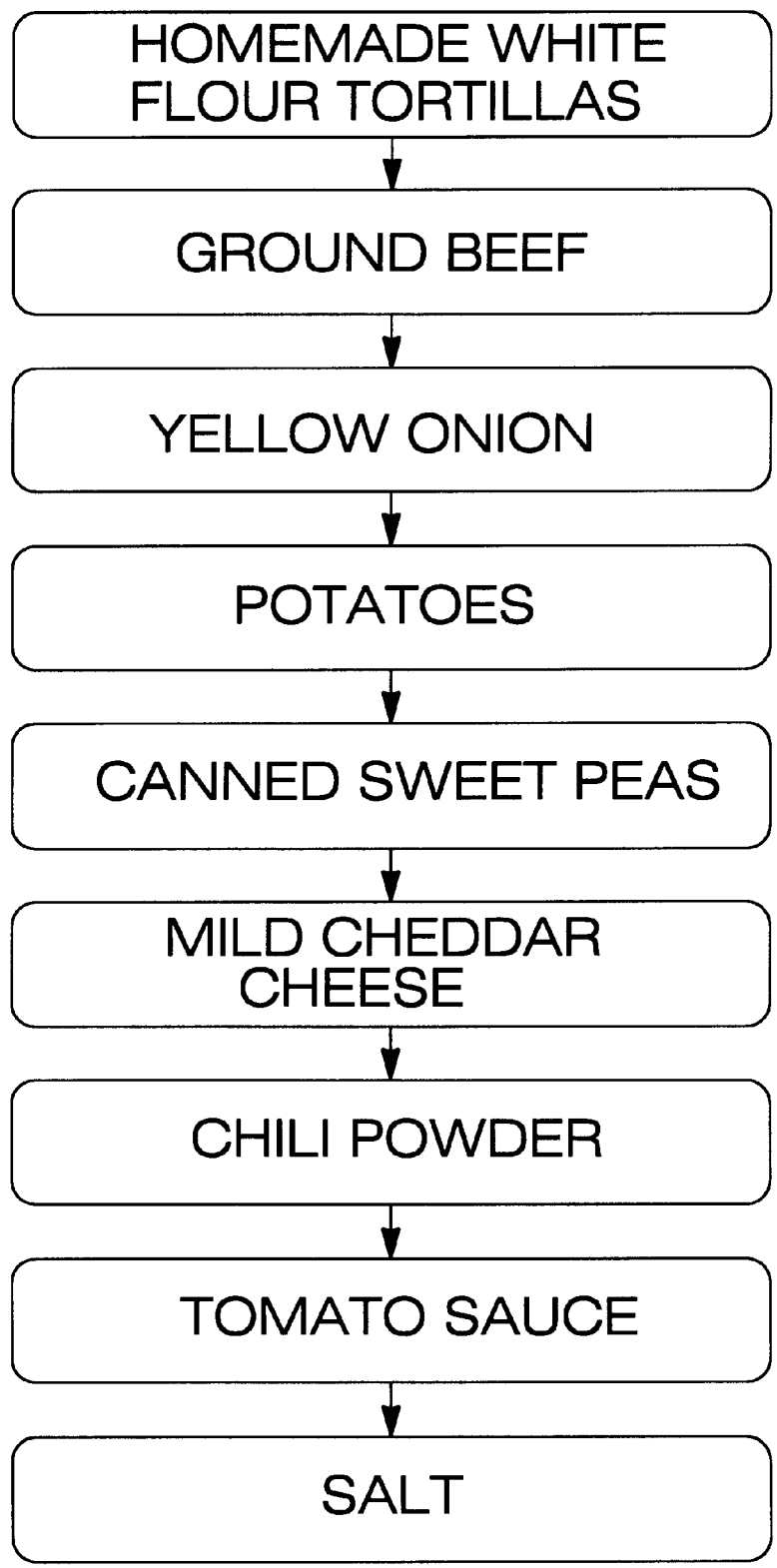
FIG. 1 is a chart of the ingredients of the new enchilada style food product according to the present invention.
Figure 2:
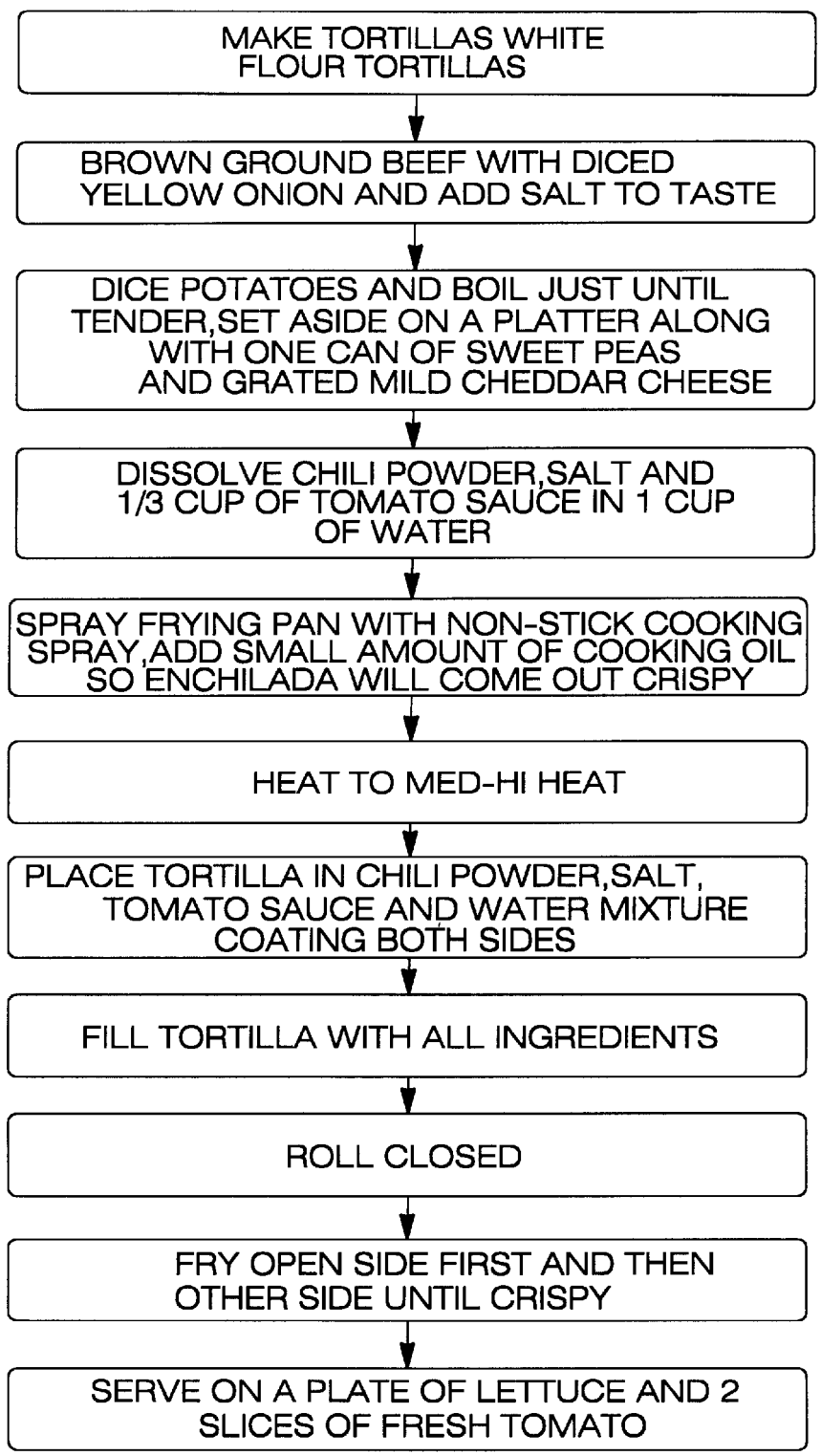
FIG. 2 is a flow chart of the preferred method of making the present invention.

With reference now to the drawings, and in particular to FIGS. 1 and 2 thereof, a new enchilada style food product and method of making embodying the principles and concepts of the present invention will be described.

As illustrated in FIGS. 1 and 2, the enchilada style food product generally comprises flour tortillas that are most preferably home-made, ground beef, yellow onion, potatoes, canned sweet peas mild cheddar cheese, chili powder, tomato sauce and salt. The method of making the enchilada style food product of the present invention most preferably begins with making home-made tortillas by combining flour, salt, cooking oil and water to form a tortilla dough; pressing or rolling out portions of the tortilla dough into flat generally round tortillas; and baking the tortillas or cooking them on a stove top griddle until they are substantially dry but flexible.

A meat mixture is formed by combining one pound of ground meat, one diced medium sized yellow onion and salt then browning the meat mixture.

The potatoes are prepared by boiling six diced potatoes until they are substantially softened. The potatoes are then drained and set aside on a separate platter with a can of sweet peas and mild cheddar cheese until they are needed.

A chili sauce mixture is made by stirring one half cup of chili powder into one third cup of tomato sauce and 1 cup of water in a medium sized bowl. Additional chili powder or water is added to the chili sauce mixture to adjust the consistency of the chili sauce mixture until the mixture is sufficiently thick to stick to and coat the tortillas.

A frying pan is first sprayed with non-stick cooking spray then approximately one tablespoon of cooking oil is added to frying pan and the pan is heated to a medium heat sufficient to crisp the tortillas when placed in the pan.

The tortillas are coated on both sides with the chili sauce mixture then the tortilla is filled by rolling the filling ingredients into the coated tortilla. The tortilla is rolled in a manner such that a seam is formed on a first side of the tortilla while the second side is substantially continuous. the filling ingredients include a portion of the ground beef and onion combination, a portion of the boiled diced potatoes, sweet peas, and cheddar cheese.

The rolled tortilla is placed into the heated frying pan such that the first side is facing downwards to abut against the heated frying pan and the first side is fried until it is crisp. Thus the frying of the first side substantially stiffens the first side for preventing the filling ingredients from spilling from the rolled tortilla. The rolled tortilla is turned over and fried until the second side of the rolled tortilla is also crisp.

The fried rolled tortilla is then garnished by placing the fried rolled tortilla on a leaf of lettuce and placing two slices of fresh tomato on one side of the fried rolled tortilla. The enchilada style food product is then ready to be served.

As to a further discussion of the manner of usage and preparation of the present invention, the same should be apparent from the above description. Accordingly, no further discussion relating to the manner of usage and preparation will be provided.

With respect to the above description then, it is to be realized that the optimum proportional relationships for the ingredients of the invention, to include variations in size, shape, form, function and manner of preparation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method for preparing an enchilada style food product, the steps of the method comprising:

providing flour tortillas;

browning one pound of ground meat with one diced medium sized onion and salt;

boiling six diced potatoes;

draining the potatoes;

forming a chili sauce mixture by dissolving one half cup of chili powder into one third cup of tomato sauce and 1 cup of water;

spraying frying pan with non-stick cooking spray;

adding approximately one tablespoon of cooking oil to frying pan;

heating frying pan to medium high heat;

coating flour tortilla on both sides with the chili sauce mixture;

rolling ground beef, onions, diced potatoes, sweet peas, and cheddar cheese into coated tortilla, the tortilla being rolled such that a first side of said rolled tortilla includes a seam formed by the rolling of the tortilla and a second side of said rolled tortilla is substantially continuous;

placing rolled tortilla into heated frying pan such that said first side of said tortilla contacts the heated frying pan and frying until said first side of the rolled tortilla contacting the frying pan is crisp and said chili sauce mixture coacts with the tortilla along the seam for sealing the seam;

turning rolled tortilla over and frying until said second side of the rolled tortilla is crisp; and serving the fried rolled tortilla.

2. A method for preparing an enchilada style food product, the steps of the method comprising:

combining flour, salt, and water to form a tortilla dough;

rolling out portions of said tortilla dough into flat generally round tortillas;

cooking said tortillas on a stove top griddle until said tortillas are substantially dry and flexible;

combining one pound of ground meat, one diced medium size, yellow onion and salt;

browning said ground meat, diced yellow onion and salt combination;

boiling six diced potatoes until said diced potatoes are substantially softened;

draining said diced potatoes;

forming a chili sauce mixture by stirring one half cup of chili powder into one third cup of tomato sauce and 1 cup of water in a medium sized bowl;

spraying frying pan with non-stick cooking spray;

adding approximately one tablespoon of cooking oil to frying pan;

heating frying pan to medium high heat;

coating one of said tortillas on both sides with the chili sauce mixture;

rolling filling ingredients into the coated tortilla, said filling ingredients including a portion of the ground beef and onion combination, a portion of the boiled diced potatoes, sweet peas, and cheddar cheese, the tortilla being rolled such that a first side of said rolled tortilla includes a seam formed by the rolling of the tortilla and a second side of said rolled tortilla is substantially continuous;

placing rolled tortilla into heated frying pan such that said first side of said tortilla contacts the heated frying pan and frying until said first side of the rolled tortilla contacting the frying pan is crisp and said chili sauce mixture coacts with the tortilla along the seam for sealing the seam;

turning rolled tortilla over and frying until a second side of the rolled tortilla is crisp; and serving the fried rolled tortilla.

3. The method of claim 2 wherein the step of combining flour, salt, and water further comprises:

adding cooking oil to said flour, salt, and water to form said tortilla dough.

4. The method of claim 2 further comprising:

garnishing said fried rolled tortilla by placing said fried rolled tortilla on a leaf of lettuce and placing two slices of fresh tomato on one side of the fried rolled tortilla.

5. The method of claim 2, wherein the step of forming a chili sauce mixture by stirring one half cup of chili powder into one third cup of tomato sauce and 1 cup of water in a medium sized bowl further comprises:

adding additional chili powder or water to adjust the consistency of the mixture until the mixture is sufficiently thick to stick to said tortillas.

6. The method of claim 2, wherein the step of placing the rolled tortilla into the heated frying pan and frying until a first side of the rolled tortilla contacting the frying pan is crisp further comprises:

placing the tortilla in the frying pan such that the first side is facing downwards to abut against the frying pan whereby the frying of the first side until crisp substantially stiffens said first side for preventing the filling ingredients from spilling from the rolled tortilla.

7. The enchilada style food product according to the method of claim 1.

8. The enchilada style food product according to the method of claim 2.

9. The enchilada style food product according to the method of claim 3.

10. The enchilada style food product according to the method of claim 4.

11. The enchilada style food product according to the method of claim 5.

12. The enchilada style food product according to the method of claim 6.

13. A method for preparing an enchilada style food product, the steps of the method comprising:

combining flour, salt, cooking oil and water to form a tortilla dough;

rolling out portions of said tortilla dough into flat generally round tortillas;

cooking said tortillas on a griddle until said tortillas are substantially dry and flexible;

combining one pound of ground beef, one diced medium sized yellow onion and salt;

browning said ground beef, diced yellow onion and salt combination;

boiling six diced potatoes until said diced potatoes are substantially softened;

draining said diced potatoes;

forming a chili sauce mixture by stirring one half cup of chili powder into one third cup of tomato sauce and 1 cup of water in a medium sized bowl;

adding additional chili powder or water to the chili sauce mixture to adjust the consistency of the chili sauce mixture until the mixture is sufficiently thick to stick to said tortillas;

spraying frying pan with non-stick cooking spray;

adding approximately one tablespoon of cooking oil to frying pan;

heating frying pan to medium high heat;

coating one of said tortillas on both sides with the chili sauce mixture;

rolling filling ingredients into the coated tortilla such that said rolled tortilla includes a substantially continuous second side and a first side, said first side having a seam formed by the rolling of the tortilla, said filling ingredients including a portion of the ground beef and onion combination, a portion of the boiled diced potatoes, sweet peas, and cheddar cheese;

placing rolled tortilla into heated frying pan such that the first side is facing downwards to abut against the heated frying pan;

frying the first side until said first side is crisp whereby the frying of the first side substantially stiffens said first side and said chili sauce mixture coacts with the tortilla along the seam for sealing the seam for preventing the filling ingredients from spilling from the rolled tortilla;

turning rolled tortilla over and frying until the second side of the rolled tortilla is crisp;

garnishing said fried rolled tortilla by placing said fried rolled tortilla on a leaf of lettuce and placing two slices of fresh tomato on one side of the fried rolled tortilla; and serving the fried rolled tortilla.

14. The enchilada style food product according to the method of claim 13.

* * * * *